May 13, 1969　　B. M. VANDERBILT ET AL　　3,443,620
REINFORCEMENT OF RUBBERY POLYMERS
Filed Sept. 3, 1965
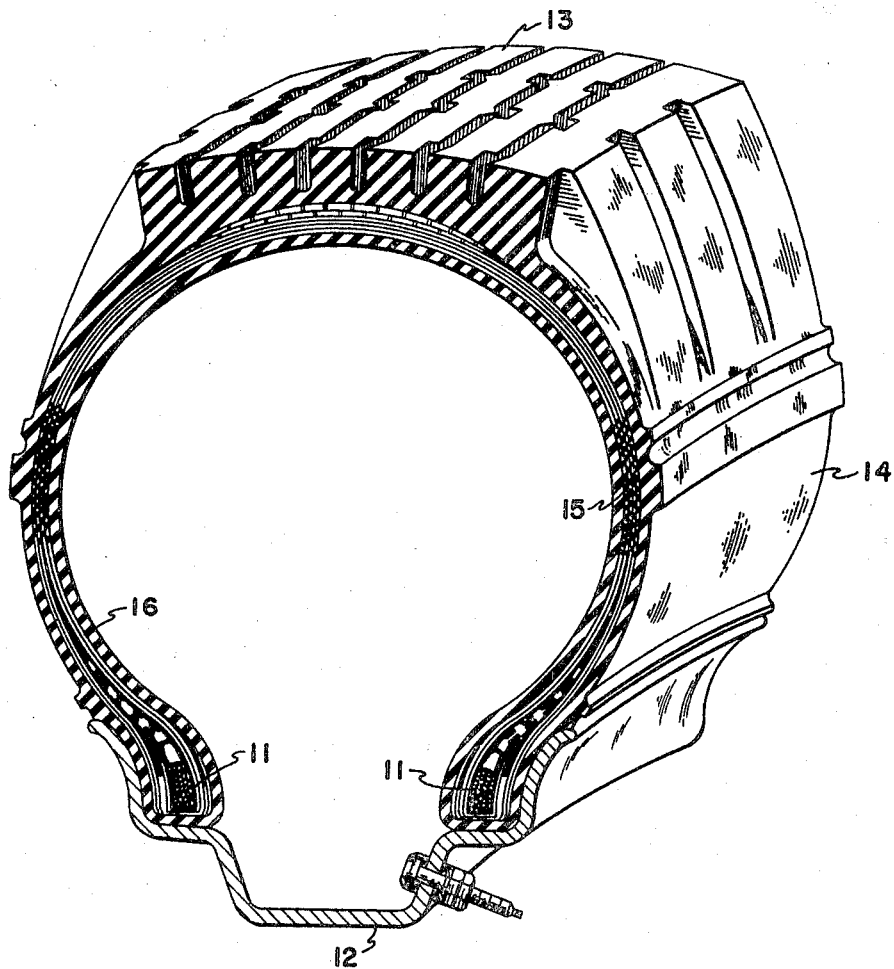
BYRON M. VANDERBILT
ROBERT E. CLAYTON
　　　　INVENTORS
BY David L. Roth
ATTORNEY United States Patent Office 3,443,620
Patented May 13, 1969

3,443,620
REINFORCEMENT OF RUBBERY POLYMERS
Byron M. Vanderbilt, and Robert E. Clayton, Westfield,
N.J., assignors to Esso Research and Engineering Company, a corporation of Delaware
Filed Sept. 3, 1965, Ser. No. 485,029
The portion of the term of the patent subsequent
to Mar. 7, 1984, has been disclaimed
Int. Cl. B32b 17/06, 13/12; B60c 5/00
U.S. Cl. 152—330                            24 Claims

ABSTRACT OF THE DISCLOSURE

The process and the product of treating siliceous reinforcement for tires with the compound having the formula

wherein $R_1$ is a vinyl group, $R_2$ and $R_3$ are selected from hydroxyl, methyl, halogen, alkoxy, acryloxy and $R_1$ and X is selected from halogen, hydroxyl, alkoxy, acryloxy and $R_1$, and X is selected from halogen, hydroxyl, alkoxy and acyloxy; further treating with a multi-unsaturated crosslinking agent containing at least 50% of its olefinic unsaturation of the 1,2-type ethylenic unsaturation and having a molecular weight of up to 15,000; and curing a free radical curable rubber while in contact with said reinforcement.

This invention relates to a method of reinforcing polymers and to a method for preparing an article suitable for the reinforcement of polymers. More particularly, this invention is concerned with the reinforcement of rubbers with a reinforcing agent and an organosilane and multiunsaturated crosslinking agent present at the rubber-reinforcing agent. This invention is also particularly concerned with the preparing of a rubber-reinforcing agent having an elastomer top coating and an organosilane and a multiunsaturated crosslinking agent present at the interface between the reinforcing agent and the elastomer.

This application is a continuation-in-part of Ser. No. 391,850, filed Aug. 25, 1964, which in turn is a continuation-in-part of Ser. No. 138,420, filed Sept. 15, 1961 and now abandoned, which in turn is a continuation-in-part of Ser. No. 30,089, now forfeited.

In the past, a polyolefinic rubber hydrocarbon has been chemically reacted with a polychloromonohydrosilane and the reaction product therefrom has been employed as film forming material to provide strongly adherent coatings to glass and ceramics; such a procedure is described in U.S. Patent No. 2,475,122. Likewise, it is known to react a polyolefinic rubber hydrocarbon with a trichlorosilane or methyl dichlorosilane at elevated temperatures and pressures and subsequently apply the resulting product to a surface which is to be bonded to a rubber, as per U.S. Patent No. 2,557,778. It should be noted, however, that these are rubber derivatives of simple silanes and are not silanes containing an olefinic group or other active group which can be bonded in one step directly to the rubber to provide a rubber to glass bond therefrom.

It has now been discovered that natural or synthetic rubbers may be effectively reinforced with any suitable reinforcing agent, providing there is present at the rubber-reinforcing agent interface an organosilane compound and a multiunsaturated crosslinking agent. It has also been found that the degree of adhesion of the reinforcing agent to the rubber is even greater if the rubber bonded to the reinforcing agent is present as a very thin elastomeric top coating and the resultant elastomer coated reinforcing agent is employed in the reinforcement of synthetic or natural rubbers.

In accordance with this invention, the reinforcing agent may be inorganic or organic in nature and may be any of those commonly employed in the reinforcement of rubbery or thermoplastic or thermosetting polymers or copolymers. Suitable for use are metallic materials such as for example, steel, iron, copper, nickel, nichrome, etc.; organic materials such as cotton, rayon, nylon, hair, vegetable fibers, "Orlon," "Dacron," etc.; siliceous materials such as glass, clays, silicas, diatomaceous earth, porcelains, quartz, etc. All of the aforesaid materials may be employed in the form of sheets, fibers, yarns, rovings, wires, powders of various particle sizes, staple yarns, woven fabrics, woven rovings, cord and chopped rovings. The preferred reinforcing agents are the siliceous materials and this invention is particularly applicable to the adhesion of a rubber to fiber glass in any of the forms set forth above.

The organosilane compounds employed in the present invention are unsaturated silanes or siloxane forms of the unsaturated silanes or mixtures of one or more unsaturated silanes with one or more of their siloxanes. The unsaturated silane may be represented by the formula:

wherein $R_1$ is a radical containing vinyl type unsaturation selected from the group consisting of alkenyl, styryl, alkenoylalkyl, and alkenoyloxyalkyl; X is selected from the group consisting of halogen, hydroxyl, alkoxy, acyloxy; $R_2$ and $R_3$ are independently selected from the group consisting of hydroxyl, methyl, halogen, alkoxy, acryloxy and $R_1$. Specific compounds which may be employed are the following: vinyl tri(beta-methoxy-ethoxy)-silane, vinyl triethoxy silane, divinyl diethoxy silane, vinyl trichlorsilane, divinyl dichlorsilane, vinyl trimethoxy silane, vinyl diethoxy chlorsilane, vinyl triacetoxy silane, allyl tri(beta-methoxyethoxy) silane, allyl triethoxy silane, diallyl diethoxy silane, allyl trichlorsilane, diallyl dichlorsilane, allyl trimethoxy silane, allyl diethoxy chlorsilane, allyl triacetoxy silane; the substitution of the above-designated chlorine atoms with bromine atoms, and in place of the vinyl and allyl groups of the above-named compounds, the corresponding propenyl, styryl, methallyl, acryloalkyl, methacryloalkyl, acryloxy propyl and methacryloxy propyl compounds as above set forth. Other specific compounds that are excellent treating agents for siliceous surfaces employed in effecting good adhesion between such surfaces and unsaturated rubbers are: gamma-methacryloxy propyl trimethoxy silane, gamma-acryloxypropyl triethoxy silane, gamma-methacryloxypropyl dimethyl chlorsilane, gamma-(beta-methacryloxyethoxy) propyl trimethoxy silane, and gamma-methacryloxy propyl methyl diacetoxy silane. All of these specific silanes are convertible into and useable corresponding silanols by hydrolysis or only partial hydrolysis with water. Also, the silanol condensation products, i.e., the siloxanes, are likewise equally useable for treating the reinforcing agent. The unsaturated silane as its acid chloride is effectively applied to, e.g., glass fibers, as a solution in a hydrocarbon solvent such as hexane or heptane, for 5 to 60 minutes, preferably at temperatures up to 200° F. followed by washing with some of the hydrocarbon solvent, and then with a polar solvent such as an alcohol or water. The organosilane-treated reinforcing agent, with or without subsequent washing, is preferably dried at room temperature for about 10 minutes to 24 hours or oven dried at temperatures below about 300° F. for about a few seconds up to about 12 hours in order to volatilize or evaporate any solvent or diluent employed in applying the organosilane.

The multiunsaturated crosslinking agent employed in this invention is a monomeric or polymeric composition having multiple points of unsaturation and capable of crosslinking to form a network as distinguished from a linear polymer structure. See, for example, "Synthetic Rubber" by G. S. Whitby et al., John Wiley and Sons, New York, 1954. The multiunsaturated crosslinking agent contains at least 50% of its olefinic unsaturation of the 1,2-ethylenic type and has a number average molecular weight of up to about 15,000.

The multiunsaturated crosslinking agent may be monomeric in nature. Such compounds include the class of multivinyl aromatic compounds having the general formula:

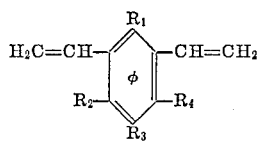

wherein $R_1$, $R_2$, $R_3$, and $R_4$ attached to the ring are each independently selected from the group consisting of hydrogen, halogens, alkyl groups containing up to 4 carbon atoms, and vinyl, and $\phi$ is an aromatic nucleus such as benzene, naphthalene, biphenyl, and phenanthrene. Specific examples are divinyl benzene, divinyl toluene, divinyl xylene, divinyl naphthalene, and trivinyl benzene. A preferred compound is divinyl benzene. Other polyunsaturated monomers of aliphatic nature may be used alone or admixed with the polyvinyl aromatic compounds defined above. These include the methacrylate esters of $C_2$–$C_{12}$ polyhydric alcohols such as ethylene dimethacrylate, butylene dimethacrylate, and the trimethacrylate esters of trimethylol propane. Also the corresponding acrylate esters of $C_2$–$C_{12}$ polyhydric alcohols may be used, or multivinyl esters such as divinyl adipate and multiallyl esters such as triallyl cyanurate (preferably used as a solution in petroleum ether or other organic solvent.) Vinyl fumarate, allyl fumarate, and the multivinyl ethers are likewise applicable. However, the multivinyl aromatics and the methacrylate esters of the polyhydric alcohols are preferred. The minimum operative concentration of the unsaturated monomer is a monomolecular layer on the glass surface. If divinyl benzene is employed in this embodiment, it is advantageous to have it contain a minimum of a styrene-type monomer. Commercial grade divinyl benzene contains 55% of the active ingredient and about 40% of ethyl styrene. Although this concentration of divinyl benzene is applicable, improved results are obtained with divinyl benzene of 80% or even higher concentration.

The multiunsaturated crosslinking agent may also be a normally liquid polymer prepared from 50 to 100 weight percent of a C4–C6 conjugated diolefin and from 50 to 0 weight percent of a vinyl-containing monomer such as styrene, vinyl toluene, methyl methacrylate, butyl acrylate, etc. polymerized with a suitable catalyst such as metallic sodium, an organic peroxide, boron trifluoride complexes, metal alkyls and the like. The multiunsaturated crosslinking agent may also be a normally solid resinous polymer prepared from 40 to 80 weight percent of a C4–C6 conjugated diolefin and from 60 to 20 weight percent of the same vinyl-containing monomer. Other multiolefins having non-conjugated double bonds yielding resins of low molecular weight either as polymers or copolymers are also useful provided they yield products containing more than 50% of their olefinic double bonds of the 1,2-type. These monomers are isoprene, 1,3-pentadiene, the hexadiene, divinyl benzene, etc. In all cases, however, the monomeric and polymeric crosslinking agents contain non-conjugated polyunsaturation, have a number average molecular weight up to about 15,000, preferably between about 1,500 and about 3,000, and contain at least 50% of the total olefinic unsaturation as the 1,2-type (i.e., vinyl groupings resulting from the 1,2-type of polymerization linking). Polymers formed by 1,4-polymerization of butadiene are not suitable because they do not contain appreciable amounts of the required vinyl side groups. These polybutadienes from catalysis using metallic sodium or butyl lithium, for example, can be synthesized so that they do contain more than 50% of their unsaturation in the form of 1,2-unsaturation, i.e., vinyl side groups. The process of preparing those polymers and copolymers is described in detail in U.S. Patents 2,762,851 and 3,097,108 which representative disclosures and teachings are incorporated herein by reference. Normally liquid polybutadiene and butadiene-styrene copolymer are particularly useful. Butadiene block copolymerized with styrene using butyl lithium catalysts yields liquid polymers using up to 15% styrene, tacky solids when using from 15 to 25% styrene, and dry solids with higher styrene contents. They are all primarily of 1,2-type unsaturation and effective sizing agents for the glass fiber strands. The normally solid resinous copolymer of butadiene with about 45 weight percent of styrene of about 13,000 molecular weight of high 1,2-type unsaturation is likewise a highly useful sizing and crosslinking agent. It is dispersed in an aqueous emulsion in about 4% concentration using a non-ionic type of emulsifier (ethylene oxide condensation with nonyl phenol) and was used to contact glass cloth which had first been silane treated.

The normally liquid polybutadiene resins prepared by sodium catalysis may be further graft polymerized with styrene using an organic peroxide catalyst such as benzoyl peroxide, to prepare solid copolymers of about 2,000–3,000 molecular weight. They are useful in this invention as crosslinking agents between the unsaturated silane and the unsaturated rubbers. The proportion of monoolefinic constituents used is controlling in determining the degree of tackiness and melting point of the resin. Specifically, butadiene ordinarily should comprise at least 40 weight percent of the solid resin with the monoolefin, if a copolymer is used, such as styrene, making up the remainder of the resin. Not only are these solid resins effective in bonding the glass fibers to rubber but when placed in emulsions or in organic solvent solution, they serve as excellent sizing (in place of oil and starch or in place of polyvinyl acetate) for glass monofilaments when drawn. Such novel sizings need not be burned off or the fibers heat cleaned especially so if the cement or emulsion also contains the unsaturated silane coupling agent. The end or strand can be immediately formed by gathering some 250 single so treated monofilaments.

The rubbers employed in this invention are those which are capable of being cured with a free radical curing agent. These rubbers include natural rubber, synthetic polyisoprenes, ethylene-alpha olefin copolymers and terpolymers, the copolymer of butadiene with styrene (SBR), the copolymer of butadiene with acrylonitrile (NBR), chlorinated butyl rubber, brominated butyl rubber, polybutadiene, polychloroprene (neoprene) and mixtures of two or more rubbers thereof. Butyl rubber is prepared by reacting 70 to 99.5% of a C4–C7 isomonoolefin, i.e., isobutylene with from 30 to 0.5% of a C4–C10 conjugated diolefin, e.g., isoprene, butadiene, piperylene, in accordance with the well known process described in U.S. Patent 2,356,128, which patent is incorporated herein by reference. The chloro or bromo butyl rubber containing at least 0.5 wt. percent of halogen in the rubbery polymer but not more than about 1 atom of chlorine per double bond in the rubber or not more than 3 atoms of combined bromine per double bond in the butyl rubber are described in detail as to properties and methods of preparation in U.S. Patent 2,944,578 which is incorporated herein by reference. The rubbery copolymer of butadiene with styrene may be prepared in accordance with the process described in U.S. Patent No. 1,938,730 which is incorporated herein by reference. The rubbery copolymer of butadiene with acrylonitrile may be prepared by the process described in U.S. Patent 1,973,000 which is also incorporated herein by reference.

The free radical curing agents employed in this invention may be any composition which acts as a free radical donor such as diazomethane, alpha-alpha-azo diisobutyronitrile or the preferred organic peroxides such as dicumyl peroxide, di-t-butyl peroxide, or 2,5-dimethyl-2,5-di(tertiary butyl peroxy) hexane. Other peroxides that can be employed are: cumene hydroperoxide; 2,5-dimethyl-2,5-di-(tertiary butyl peroxy) hexyne-3; t-butyl cumyl peroxide; t-butyl perbenzoate; the peroxides obtained by the oxidation of hydrogenated rosin; and di-t-butyl diperphthalate. The free radical curing agent is generally employed in an amount of 0.2 to 10 parts, preferably 0.5 to 5 parts, especially 1.0 to 2.5 parts per 100 parts of the free radical curable elastomer. Preferably, the free radical curing agent is employed in admixture or compounded with the free radical curable elastomer.

In practicing one alternative of the present invention, the reinforcing agent is first provided with an organosilane finish treatment of the reinforcing agent with the organosilane as carried out by spraying, immersion of the reinforcing agent in an emulsion or solution of the organosilane, brushing, dipping etc. for from 5 seconds to 60 minutes at temperatures up to about 200° F. The silane finish is formed up to a thickness of about 10 to about 40 molecules (after drying).

The organosilane compound may be applied as a liquid composition, i.e., an aqueous solution or emulsion or anhydrous organic solvent solution or emulsion containing the organosilane. In the aqueous solution, the organosilane, since it is hydrolyzable, is present either as a silanol or as a siloxane (polymerized form of the silanol) or as a mixture of both. In the aqueous emulsion, if sufficient water is present, the same forms of the silane hydrolysis products are present. However, the silane can be used in organic and anhydrous solvents in which case the silane is present as such or it may be pretreated with less than stoichiometric amounts of water thus to only partially hydrolyze the ester groups so that only one or two hydroxyl groups are attached to the silicon atom per molecule. In this case, the modified silane is employed in an anhydrous organic solvent solution either alone or as a blend with the multiunsaturated crosslinking agents hereinbefore described. At any event, the concentration of the silane in aqueous solution, emulsion, or anhydrous organic solvent ranges between about 0.2 and about 5.0 wt. percent, preferably between about 0.4 and about 3.0 wt. percent. This results in a deposit of silane, based on the reinforcing agent weight, of between about 0.1 and about 3.0 wt. percent, preferably between about 0.5 and about 2.0 wt. percent. The silane is applied to glass monofilaments as spun or drawn, to bundles, strands, or ends, to cord or even to glass fabric. The glass surface must be free of conventional size and/or lubricant and if necessary it is heat cleaned to remove such substances, before application of the silane, by heating it up to 600–1500° F. for about 10 minutes to a few seconds.

The organosilane treated reinforcing agent is then treated with a liquid composition, i.e., an aqueous emulsion or organic solvent solution, containing the multiunsaturated crosslinking agent, present in an amount from about 0.1 to about 10 weight percent of the total liquid composition, preferably between about 3 and about 5 weight percent. This allows for between about 0.5 and about 8 weight percent, preferably 1 to 3 weight percent to be deposited on the surface of the organosilane treated reinforcing agent. In this "two-step" treatment, it is also desirable to add about 0.25 to about 5 weight percent of the free radical curable elastomer in order to add "body" to the liquid composition. Conversely, about 0.25 to about 5 weight percent of the free radical curable elastomer may be added to the liquid composition containing the organosilane for the same purpose. Addition of the free radical curable elastomer to either liquid composition is particularly desirable when the multiunsaturated crosslinking agent of choice is monomeric in nature, e.g., a multivinyl aromatic compound or a methacrylate ester of a polyhydric alcohol hereinbefore described.

As a second alternative, the multiunsaturated crosslinking agent may be present in the liquid composition containing the organosilane compound. In this instance, wherein the amounts of organosilane and crosslinking agent would be the same as hereinbefore described, a "one-step" treatment of the reinforcing agent is possible. This "one-step" treatment is particularly advantageous in the treatment of glass filaments or fibers as they are being formed, e.g., immediately after they emerge from the bushing of the glass fiber spinning machine. The preferred choice of the multiunsaturated crosslinking agent in this "one-step" treatment is a normally liquid or solid resinous polymer of the type hereinbefore described. In addition, it may be desirable to dry the organosilane-treated reinforcing agent, prior to contact with the free radical curable elastomer, at ambient temperatures or at elevated temperatures up to about 350° F. until substantially all of the diluent or solvent employed in the liquid composition has evaporated. In such a case, it gives little beneficial effect to initially treat the reinforcing agent with a blend of organosilane and monomeric crosslinking agent since most of the monomer would be lost by evaporation or volatilization during drying. The organosilane of course, does remain, but the results, upon contact and curing with the elastomer would be inferior and no better than obtained with a silane treatment alone.

As a third-alternative, the reinforcing agent may be initially treated with the organosilane as described above and the multiunsaturated crosslinking agent is incorporated on the surface of, or within, the elastomer to be reinforced. In this method, the crosslinking agent is present in an amount of up to 25 parts per 100 parts of the elastomer.

After one of the three alternative methods described above have been carried out, the free radical curable elastomer to be reinforced and the organosilane-treated reinforcing agent (with a multiunsaturated monomer present on the reinforcing agent or on or within the elastomer) are placed contiguously or intermingled in conventional vulcanizing equipment and heated at a temperature between about 250° and about 400° F., preferably between about 280° and about 330° F. for between about 5 and about 120 minutes, preferably between about 10 and 45 minutes, and cured, under pressure of between about 5 and about 1,000 p.s.i.g., preferably between about 50 and about 600 p.s.i.g. Curing is accomplished with the aid of a free radical type curing agent of the types and amounts hereinbefore described. Without being restricted to any theory, it is believed that the free radical curative functions as a free radical donor catalyst to copolymerize the unsaturated silane with rubber. The multiunsaturated crosslinking agent enters into this copolymerization and makes it more complete.

If desired, conventional pigments, stabilizers plasticizers, metal oxides, fillers, antioxidants, carbon blacks, etc. may be incorporated in the rubber to be reinforced, in amounts ranging from 0.2 to 100 parts or more, per 100 parts of the rubber prior to curing of the rubber in contact with the reinforcing agent.

It has been established that glass, which is not finished with an unsaturated silane is inoperative, whether used in conjunction with a multiunsaturated crosslinking agent or not. Likewise, a vinyl silane finished glass in contact with rubber, without the multiunsaturated crosslinking agents, although operable, does not adhere as strongly as when the multiunsaturated crosslinking agents are used. It is necessary to employ the combination of an unsaturated silane with a free radical curative since only weak adhesion will result if the glass is finished with a saturated silane, such as ethyl silane. Although it is known in U.S. Patent No. 2,891,885 to utilize an unsaturated silane in a glass-polyester laminate it could not be expected that the unsaturated silane provides adhesion to a rubber, such as a polyisoprene, because the polymerization ability of free radical curable rubbers is entirely different from that of polyesters. As an example in point, it has not been recognized that rubbers are capable of being further polymerized with multiunsaturated resins or monomers such as polybutadiene resin or divinyl benzene.

In practicing another embodiment of the present invention, an improved rubber-reinforcing article is obtained by treating the reinforcing agent as described in either the first or second alternatives (i.e., by treating the reinforcing agent with the organosilane-liquid composition followed by subsequent treatment with the crosslinking agent-liquid composition or by treating the reinforcing agent with a liquid composition containing an admixture of the organosilane and crosslinking agent). As was the case with the first and second alternative methods, about 0.25 to about 5 parts of the free radical curable elastomer may be added to give "body" to the liquid compositions which contain the same ingredients in the same amounts as hereinbefore described. The reinforcing agent treated with the organosilane and the crosslinking agent is used as is or preferably dried to evaporate any diluent or solvent thereon and is subsequently treated with a liquid composition containing a free radical curable elastomer and a free radical curing agent. Alternatively, the crosslinking agent may be added to the latter liquid composition rather than to the liquid composition containing the organosilane or employed in a separate liquid composition.

The liquid composition containing the free radical curable elastomer and the free radical curing agent will contain 5 to 70 weight percent, preferably 15 to 55 weight percent, of the elastomer and 0.2 to 10 parts, preferably 0.5 to 5 parts, per 100 parts of the elastomer, of the curing agent. The liquid composition may be in the form of an aqueous emulsion, organic solvent solution, a plastisol, an organosol, a dispersion or a cement, or latex in a suitable inert diluent such as $C_4$–$C_{12}$ saturated hydrocarbon, e.g. pentane, isohexane, hexane, octane, etc. The free radical curable elastomer and the free radical curing agent may be any of those previously referred to hereinbefore.

If desired, conventional pigments, stabilizers, antioxidants, plasticizers, metal oxides, fillers, carbon blacks etc. may be incorporated in the liquid composition containing the free radical curable elastomer and curing agent in amounts ranging from 0.2 part to 100 parts or more, per 100 parts of the elastomer.

If alkyl silanes containing functional substituents on the alkyl groups such as amino, mercapto, epoxy, carboxyl, cyano, and the like, as described in copending commonly assigned application Ser. No. 392,027 (filed Aug. 25, 1964), which disclosure is incorporated herein by reference in its entirety, are used as the organosilane compounds, then the curing agents incorporated within the very thin elastomer top coating on the reinforcing agent may be sulfur, sulfur-containing compounds, vulcanization accelerators, metal oxides and the like, rather than or in addition to a free radical curing agent and the elastomer itself need not necessarily be one which is capable of being cured with a free radical curing agent as described in said Ser. No. 392,027.

After treatment of the silane and crosslinking agent-treated reinforcing agent with the liquid composition containing the elastomer and curing agent, the resultant product is then dried to remove substantially all of any diluent or solvent used in applying the silane, crosslinking agent and elastomer-curing agent. Drying may take place in air at room temperature over a period of several minutes to 24 hours or more; alternatively the coated reinforcing agent may be dried at elevated temperatures, e.g., 100° to 1000° F. for a few seconds up to 10 minutes. In general, the drying conditions may vary considerably, depending on the types and amounts of diluent or solvents as well as the thickness of the silane, crosslinking agent and elastomer coatings. The only caution that must be observed during the drying operation is that when drying at elevated temperatures, the drying time and drying temperatures should be such as to evaporate off substantially all of the diluent or solvent but not so extreme as to cross-link or cure the elastomer, i.e., the free radical curing agent-containing elastomer must remain in a curable state.

After drying, a reinforcing agent having a very thin nontacky top coating of the free radical curable elastomer and the free radical curing agent is obtained. This top coating may vary in thickness from about twice to about one tenth, or less, of the thickness or diameter of the reinforcing agent. Generally, the elastomer top coating will comprise about 10 to 60 weight percent, preferably 15 to 45 weight percent of the total weight of the dried, elastomer-coated reinforcing agent. The elastomer coating will also contain 0.2 to 10 parts, preferably 0.5 to 5 parts, per 100 parts of the elastomer, of a free radical curing agent.

It has been found that natural or synthetic rubbers can be effectively reinforced with a reinforcing agent whose surface contains an initial coating of an organosilane and a crosslinking agent and a top coating of an elastomer containing a free radical curing agent. After drying, the resultant elastomer-coated reinforcing agent when cured in contact with a natural or synthetic rubber, affords a product having a much higher bursting and tensile strength than is possible by curing the natural or synthetic rubber in contact with a reinforcing agent containing no elastomer top coating. The dried elastomer-coated reinforcing agent is nontacky in nature, very flexible and possesses an extremely high tensile strength. The dried elastomer-coated reinforcing agent may be used immediately or it may be stored for long periods of time, e.g., from one day to several years, until it is desired to use it in the reinforcement of natural or synthetic rubbers; no significant loss of the aforesaid physical properties is noted after prolonged periods of storage.

The dried elastomer-coated reinforcing agent may then be used for the reinforcement of natural or synthetic rubbers. The natural or synthetic rubbers to be reinforced with varying amounts, e.g. 0.2 to 100 parts or more, per 100 parts of the rubber, of conventional curatives and fillers such as sulfur, sulfur type compounds, accelerators, stabilizers, metal oxides, extender oils, heat reactive resins, plasticizers, antioxidants, clays, quinones, peroxides, carbon blacks, etc. commonly employed in the rubber industry.

Reinforcement of the desired natural or synthetic rubber takes place by contacting the dried elastomer-coated reinforcing agent with the rubber to be reinforced either contiguously or intermingled in conventional vulcanizing equipment and curing the resultant elastomer-coated reinforcing agent-rubber composite at a temperature between about 250° and 400° F., preferably between about 280° and about 330° F. for between about 5 and about 120 minutes, preferably between about 10 and about 45 minutes, and under pressure of between about 5 and about 1,000 p.s.i.g., preferably between about 50 and about 600 p.s.i.g.

The rubber to be reinforced may be any one of those referred to hereinbefore as "an elastomer capable of being cured by a free radical curing agent." However, it should be understood that the rubber to be reinforced need not necessarily be one which is free radical curable nor does the reinforcement process require the use of a free radical curing agent. The rubber to be reinforced may be compounded with conventional amounts of any well known curing agent such as sulfur, sulfur-type compounds, quinones, sulfur accelerators, metal oxides (e.g. ZnO), phenolaldehyde resins, etc. as well as organic peroxides. Once the surfaces of the reinforcing agent have been substantially coated with the free radical curable elastomer, the chemistry which occurs during the reinforcement process is that involved in the bonding of two same or dissimilar rubbers to each other. Without being restricted to any theory, it is believed that during the reinforcement process (which takes place at elevated temperatures) the free radical curing agent serves to cause a tight bond between the organosilane and the reinforcing agent and to copolymerize the organosilane with the elastomer coating. Simultaneously, the conventional curing agent in the rubber to be reinforced causes a tight bond between it and the elastomer top coating on the reinforcing agent. It is recognized by those skilled in the art that the rubber to be reinforced and/or the elastomer which forms the top coating on the reinforcing agent are generally selected on the basis of their known compatibility with each other and the curing system is generally one which has been proven to be effective for bonding the selected rubber to be reinforced to the selected elastomer top coating on the reinforcing agent.

The unitary end products herein are advantageously employed in a tire structure, e.g., a jet plane tire. These tires are stronger, more durable, more dimensionally stable, more resistant to heat, and more resistant to weathering than are conventional tires. In the past, jet plane tires contain nylon which melts at a temperature of 482° F. Unless the tire wells in the plane are refrigerated, the tires during flight can become heated to a temperature as high as about 450° F. This causes great weakening of the tires and restricts the design of aircraft due to the relatively low softening points of organic fibers contained in the tires. Although refrigeration has been used, this is not entirely satisfactory since it provides excessive ballast and also increases cost. High tire temperatures are also encountered from the friction between the tire and runway surface during take-off and landing operations. The exact temperatures obtained are unknown, but are undoubtedly excessive enough to be a major factor in the high incidence of blow-outs during these operations.

The desirability of replacing nylon tire fabric with glass cord fabric is known since glass has a tensile strength of 200,000 to 250,000 p.s.i. as compared to 89,000 to 108,000 p.s.i. for nylon. Furthermore, glass maintains its full strength up to 600° F. and retains 25% of its strength at 1000° F. It also has good dimensional stability, i.e., it does not continue to grow in length; more than that, glass is not flammable and does not corrode. Steel is not suitable as a substitute for nylon since it is heavy, i.e., having a density of 7.8, and it is relatively inflexible, i.e., having an elongation of only 1 to 2%. In the past, it has been attempted to use glass in lieu of nylon for the manufacture of tires. However, these attempts have been unsuccessful due to the poor adhesion between the glass and the rubber. If, for example, glass cord was used for the carcass ply cord in an automobile tire, a failure would result in 100 to 1,100 miles due to ply separations and self-abrasion of the cord filaments.

In this invention, the multiunsaturated crosslinking agent and elastomer top coating (if any) applied to the silane-treated glass filaments, is adhered strongly to the glass. Therefore, the glass is protected against the self-abrasion of the cord filaments, i.e., the filaments are separated from one another and cannot rub together and break. Similarly, ply separation does not occur in the instant tires since the carcass ply rubber composition is tightly bonded to the glass fabric.

Besides superior jet tires, other tires, e.g., bus and truck tires, and off the road earth moving equipment tires, can be provided herein. It is known that these tires build up considerable heat during highspeed or cross country off-road driving. To alleviate this problem thinner tires have been fabricated in which steel wire is employed as the carcass ply cord. However, this is not entirely satisfactory since the steel cord produces a hard riding tire. Tires which continue to stretch during use, e.g., those with nylon ply cords therein, become progressively weaker. This weakening occurs because the cord strength is reduced, and because rubber compositions therein are placed under increasing stress as the tire becomes permanently larger. This increases the incidence of stress cracks in the sidewall rubber and tread rubber and also increases the incidence of weather cracking since stretched rubber compositions are readily attacked, i.e., cracked by ozone. Glass is dimensionally stable, i.e., the glass tire cords do not "creep" or grow in length; and therefore, the glass cords do not thin down and diminish in strength and the rubber components of the tire are not placed under increasing stress. Furthermore, the tires of this invention are superior since the casing can be more frequently reused, that is, the number of times the casing can be recapped with new tread is increased.

A stronger and more durable racing tire is another example of the applicability of the present invention. Another example is a boat trailer tire which involves an additional factor besides the strength, durability, etc.—namely, resistance to water. If the trailer wheels are immersed in water when the boat is launched or returned to the trailer, the water may be in contact with punctures, cuts, and/or abraded spots in the tire fabric. Obviously, a steel tire cord would be inoperative due to rust formation thereon. It should also be noted that water from snow and rain can cause damage to exposed fabric in any prior art tire especially if snow-melting chemicals, which are particularly corrosive to steel tire cord, are found therein. Furthermore, water would be wicked along the ply cord if it were not chemically bonded to the surrounding rubber. This is a particular problem to tire recappers since the water that has wicked into the casing turns into steam during the curing steps which causes a laminate separation or blister.

The rubber compositions adjacent to the glass are also important in the instant invention. Any rubbery polymer suitable for tires can be used herein. However, halogenated butyl rubber, particularly chlorinated butyl rubber, is preferred.

The accompanying drawing shows FIGURE 1 to be a cross-sectional view in perspective of a pneumatic tubeless tire employing therein the glass-rubber of the present invention, wherein the tire is depicted as being mounted on a conventional tubeless type of tire wheel rim. The pneumatic tubeless tire comprises a hollow toroidal-type member which is substantially U-shaped in cross-section by virtue of an open portion which extends around the inner periphery of the member. In other words, the member is a tubular-type structure which has a cross-section in the form of an open-bellied body with spaced terminal portions to define a member generally resembling a horseshoe wherein the open portion of the horseshoe-shaped member faces toward the interior circumference of said member. The terminal portions constitute the bead portions 11—11 of the tire, inside of which are a plurality of bead wires adhesively imbedded and molded in a rubbery composition. The outer surface of the bead portion is advantageously shaped so as to function as an air-sealing means, such as a plurality of ribs, to aid in adhesion to rim 12 when the tire is inflated. The remaining outer surface of the tire also includes tread area 13 and sidewalls 14. The remaining construction of the tire may vary according to conventional fabrication, but in general the tire is a multilayered type of structure with an outer layer as above-mentioned. The layer next adjacent the outer layer generally comprises a carcass 15 which contains one or more layers of glass fiber, usually in the form of fabric, constructed from roving or twisted yarn or plied yarn (cord) which has been treated preferably either at the monofilament or strand stage of fabrication with the compositions of this invention, e.g., silanes, multiunsaturated crosslinking agents, and subsequently coated with carcass rubber composition. The tire also includes an inner lining 16, advantageously made from butyl rubber or halogenated butyl rubber which must be substantially impermeable to air. The above multi-layers, at least three in number, are conventionally bonded and adhered together, for example, by vulcanization to form a tire of a unitary structure. The glass-rubber composition of the present invention may be generally employed throughout the tire, but it is especially desirable in the carcass area because of its improved strength, dimensional stability, resistance to heat, and good service life in general. In one embodiment, a tubeless tire comprises a casing of an outer layer including the tread, sidewall, outer bead portion of a rubbery composition, e.g., chlorinated butyl rubber. It also comprises an intermediate layer or carcass of glass cord that had been coated with a vinyl-type unsaturated silane and chlorinated butyl rubber composition applied during manufacture of the glass fiber and then coated with chlorinated butyl rubber carcass composition applied after the glass had been woven into tire fabric form and an inner liner of a rubbery composition, e.g., chlorinated butyl rubber composition. Curing is accomplished in a similar manner heretofore described for the rubbery polymer coated silane finished glass, per se.

Further disclosures of the techniques for preparing the elastomer coated reinforcing agent of this invention and for reinforcing various rubbers with the instant elastomer-coated reinforcing agents may be found in commonly assigned copending applications Ser. No. 391,850, filed Aug. 25, 1964, Ser. No. 420,264, filed Dec. 22, 1964, Ser. No. 421,546, filed Dec. 28, 1964, and Ser. No. 423,372, filed Jan. 24, 1965, as well as in "The Bonding of Fibrous Glass to Elastomers" by B. M. Vanderbilt and R. E. Clayton, and "Glass Fiber Reinforced Elastomers" by R. E. Clayton and R. L. Kolek, presented at the American Chemical Society meeting of Sept. 4, 1964 (Chicago, Ill.). All of the aforesaid patent applications and publications are incorporated herein by reference in their entirety.

The following examples are submitted to illustrate the invention. Unless otherwise indicated, all parts and percentages in the specification are based upon weight.

Example I

A solution was prepared comprising 1.25 percent of vinyl trichlorosilane in xylene as the solvent. A glass plate, of the type employed for mounting photographic slides, was immersed in this solution for 30 minutes. Subsequently, the plate was washed with water and air dried for about 60 minutes to provide a product having a very thin silane finish appearing merely as a cloudiness on the glass surface. Divinyl benzene of 98% purity was brushed onto the finished glass as a thin film. The glass plate treated was subsequently cured in a platen press under a pressure of 500 p.s.i.g. for 1 hour at 300° F. in contact with a natural rubber layer 0.05 inch in thickness containing 1.5 wt. percent of dicumyl peroxide as the curative. The end products therefrom were subjected to qualitative screening type adhesion tests wherein the rubbery layer broke before failure occurred in the glass-rubber bond.

The aforementioned procedure was repeated several times with the following modifications: (1) glass, without unsaturated silane finish, and without divinyl benzene applied thereon, was contacted and cured with the rubber; (2) glass, with the vinyl silane finish thereon, but without the divinyl benzene applied thereon was contacted with the rubber; (3) glass, without the unsaturated silane thereon, but with a divinyl benzene thereon, was contacted and cured with the rubber. The same peroxide curing procedure was used in all cases. In qualitative adhesion tests, no adhesion was obtained in the combinations (1) and (3). Good bond strength was obtained with combination (2). Best adhesion was obtained when divinyl benzene was used in addition to the unsaturated silane.

This example demonstrates that the unsaturated silane is necessary for obtaining a good bond, and that the bond strength is further improved by using divinyl benzene in addition to the unsaturated silane.

Example II

The procedure in Example I was repeated, except that 55% grade divinyl benzene was employed in lieu of the 98% purity divinyl benzene described therein. The end product utilizing the unsaturated silane finish and divinyl benzene application had good adhesion but it was not as strong as that obtained by utilizing divinyl benzene of a concentration of 98%.

Example I was also repeated using styrene (a monofunctional monomer) in place of divinyl benzene. This did not prove to be a practical substitute for the divinyl benzene.

Example III

A glass plate was finished with ethyl silane, a saturated silane, using the finishing, coating and curing procedures described in Example I. No adhesion was obtained. This demonstrates the necessity of not using a simple saturated silane finish for the purpose of the instant invention.

Example IV

One hundred parts of natural rubber were compounded with 40 parts of fine thermal carbon black (P-33 carbon black) and 1.5 parts of dicumyl peroxide. This compounded rubber was contacted with a glass plate having the vinyl silane finish and high purity divinyl benzene monomer of Example I applied thereon and was then cured at a temperature of 300° F. for 60 minutes in a platen press at 200 p.s.i.g. pressure. The carbon black filed rubber, per se, had a tensile strength of about 3,000 p.s.i. However, the glass-rubber bond ws stronger than this rubber, which indicates that excellent adhesion was effected.

Example V

Rubbery compounds were prepared as indicated in Table I below. Paracril-C is a nitrile rubber manufactured by Naugatuck Chemical Division of U.S. Rubber Company, and is a copolymer of approximately 65% butadiene with 35% acrylonitrile. The chlorobutyl rubber employed herein is a copolymer of 98% of isobutylene with 2% of isoprene which has 1.2% of chlorine incorporated therein.

Glass fabric (181 satin weave) was coated with various silane compounds as set forth in Table II. The fabric was immersed at ambient temperature in benzene and the finishing agent, when used as its acid chloride was added drop-wise up to a total concentration of 2½% by weight based upon benzene. After standing in contact with the benzene solution for 2 hours, the treated fabric was rinsed in succession with benzene, isopropanol, and water. In case of A-172 and Volan, they were applied to the glass fabric as recommended in the product information bulletins furnished by the suppliers. The glass fabrics were then dried at ambient temperatures, followed by drying in a vacuum oven at 200° F. for 30 minutes.

The aforementioned fabric was then placed between two layers of rubbery compound, the outer surface of which was backed with cotton canvas to inhibit elongation during the adhesion testing. Mylar film (commercial polyester film) was inserted at one end of the resulting sandwich between one of the rubbery layers and the glass fabric to provide an opening for the start of subsequent strip adhesion testing. This specimen was cured in a press mold at a temperature of 300° F. and a pressure of 520 p.s.i.g. for 20 minutes for the natural rubber and nitrile rubber and for 60 minutes for the chlorobutyl rubber. The cured end product had the following dimensions: 6" x 2" x 5/32". A 1" wide specicen was cut for testing.

The adhesion of the cured products therefrom was determined on an Instron tester at a jaw separation rate of 2 inches per minute and the results are recorded in Table II.

It is evident from this example that a saturated silane such as ethyl trichlorosilane is inoperative, an inferior bond being provided between the glass and the rubbery polymer. Therefore, it is necessary to utilize an unsaturated silane to provide superior adhesion between the rubbery layer and the glass layer. Also it is highly significant that an unsaturated chrome finish, which is more widely used in the reinforced plastic industry than are the unsaturated silane finishes, is not effective for glass adhesion to rubber.

TABLE I.—TEST COMPOUNDS

| | Natural rubber | Nitrile rubber | Chlorobutyl rubber |
|---|---|---|---|
| Pale crepe | 100 | | |
| Paracril-C | | 100 | |
| MD-551 | | | 100 |
| SRF black | 50 | 50 | 50 |
| Stearic acid | 1 | 1 | 1 |
| Zinc oxide | 5 | 5 | 3 |
| Aminox | 0.5 | 0.5 | |
| Magnesium oxide | | | 2.0 |
| Dicumyl peroxide | 1.5 | 1.5 | 1.5 |
| Triethanolamine | | | 1 |

TABLE II.—EFFECT OF GLASS FINISH ON ADHESION FOR VARIOUS RUBBERS

| | Adhesion, lb. pull/in. | | |
|---|---|---|---|
| Glass finish chemical | Natural rubber | Nitrile rubber | Chlorobutyl rubber |
| None | 2.0 | 2.0 | 2.5 |
| A-172 vinyl silane [1] | 28.0 | 35.4 | 13.7 |
| Volan [2] | 3.8 | 3.3 | 5.9 |
| Divinyl dichlorosilane | 10.1 | | 19. |
| Allyl trichlorosilane | 3.6 | 3.4 | 10.4 |
| Ethyl trichlorosilane | 2.1 | 2.1 | 7.4 |

[1] A-172 is a commercial form of vinyl silane being the vinyl silane ester of the monomethyl ether of ethylene glycol. It is marketed by Union Carbide Corporation.
[2] A Werner type compound in which methacrylic acid is coordinated with chromium to form a highly reactive complex. It is marketed by the Du Pont Company.

Example VI

Peroxides other than dicumyl peroxide can be used for curing. For example, natural rubber was compounded as in Table I except that 1.5 parts of 2,5-bis(tertiarybutylperoxy)-2,5-dimethylhexane was used in place of dicumyl peroxide. Adhesion specimen with A-172 vinyl silane finished glass fabric was prepared and tested as in Example V. The resultant adhesion was 30 lb./in.

Example VII

Experiment VI was repeated except that the peroxide used was di-tertiarybutyl peroxide. In this case the adhesion to A-172 vinyl silane finished glass fabric was 24 lb./in.

Example VIII

Glass cloth (No. 181 weave) was coated or treated with a solution of vinyl tri-(beta-methoxyethoxy) silane (A-172), washed and dried. The rubber layers between which this fiber glass cloth was placed and vulcanized was compounded as follows: 100 parts of Paracril C, 50 parts of SRF carbon black, 0.5 part of Aminox, 5 parts of zinc oxide, 1 part of stearic acid, 15 parts of dibutyl phthalate, and 3.75 parts of dicumyl peroxide deposited (40% conc.) on HAF carbon black. While contact with the treated glass cloth, the rubber layers were vulcanized for 20 minutes at 307° F. at 520 p.s.i.g. The resultant adhesion showed 10 lbs. pull per inch. The above test was repeated but was modified by placing polybutadiene of 2,200 molecular weight prepared by metallic sodium catalysis in a mixed benzene and hexane solvent. 2 parts of 2,5-dimethyl-2,5-di-(tertiary butyl peroxy) hexane, and 2 parts of dicumyl peroxide per 100 parts of polybutadiene were also included. A solution of 10% solids in the benzenehexane was used to contact the glass fabric coated with the vinyl silane. The adhesion between rubber and glass was 20 lbs. pull per inch or about double that obtained using no polybutadiene crosslinking agent.

Example IX

Specimens were prepared in a similar manner as described for Example V with the rubbery compounds indicated in Table I and with vinyl silane as the unsaturated silane finish on the glass fabric. In the instant example, however, a coating of various polyunsaturated monomers as indicated in Table III was brushed onto the rubbery layer in an amount by 1% by weight of the rubbery layer before it was assembled to the glass fabric carrying the unsaturated silane finish. The polyunsaturated monomer contained 1.5% by weight of dicumyl peroxide. The curing procedure and testing were conducted in the same manner as heretofore described for Example V.

The present example shows that a vastly superior adhesion between glass fiber and a rubber can be obtained by employing polyunsaturated monomer in conjunction with an unsaturated silane. In fact, where the ">" symbol appears in the data, the failure was in the rubber compound itself; this indicates that the bond between the rubber and the glass was stronger than the rubber, per se.

TABLE II.—POLYUNSATURATED MONOMERS AS COUPLING AGENTS

| | Adhesion, lb. pull/in.[1] | | |
|---|---|---|---|
| Monomer [2] | Natural rubber [3] | Nitrile rubber [3] | Chlorobutyl rubber [3] |
| None | 28.0 | 35.4 | 13.7 |
| Divinyl benzene (99.7% purity) | >57.8 | >59.5 | 24.3 |
| Ethylene dimethacrylate | >57.8 | >59.5 | 28.4 |
| Butylene dimethacrylate | >57.8 | >59.5 | 28.9 |
| Propane trimethacrylate | >57.8 | >59.5 | 25.7 |
| Triallyl cyanurate [4] | 41.6 | 42.7 | 24.7 |

[1] Adhesions were pulled at 2 inches per minute.
[2] In all cases dicumyl peroxide was added to the monomer in concentration of 1.5% of the monomer by weight.
[3] The compounds employed are shown in Table I.
[4] For viscosity reduction, the triallyl cyanurate was used as a solution of 57.4% solids by weight in petroleum ether. The amount of dicumyl peroxide then added was 1.5% of the cyanurate by weight.
Note.—The glass used was fabric of 181 satin weave and A-172 finish.

Example X

Other peroxides can be used in conjunction with the polyunsaturated monomers. Specimens were prepared and tested as in Example IX except for the following modifications shown below with the results obtained.

| Natural rubber compounds, like that of Table I except for the peroxide shown below | Monomer | Peroxide added 1.5 wt. percent to the monomer | Adhesion, lb./in. |
|---|---|---|---|
| (1) 2,5-bis(tertiarybutylperoxy)-2,5-dimethylhexane. | Ethylene dimethacrylate. | 2,5-bis(tertiarybutylperoxy)-2,5-dimethylhexane. | >45 |
| (2) Like (1) | Like (1) | Di-tertiarybutylperoxide. | >45 |
| (3) Like (1) | Propane trimethacrylate. | Like (1) | >45 |
| (4) Like (1) | Like (3) | Like (2) | >45 |
| (5) Di-tertiarybutylperoxide. | Like (1) | Like (1) | >33 |
| (6) Like (5) | do | Like (2) | >33 |
| (7) Like (5) | Like (3) | Like (1) | >33 |
| (8) Like (5) | do | Like (2) | >33 |

In no case did the bond between the rubber and the glass separate. Instead, failure was in the rubber compound itself, and the failure strengths were at higher levels than in Examples VI and VII in which no monomer was used.

Sometimes it is desirable that the polyunsaturated monomer contain rubbery polymer. The rubbery polymer may be the same or different than that of the composition to be bonded. For example, a highly volatile monomer tends to evaporate too rapidly after being applied to the glass or to the rubber composition. We have found it convenient to dissolve 1 to 5 wt. percent of a rubbery polymer such as natural rubber in the polyunsaturated monomer such as divinyl benzene to reduce its evaporation rate or to regulate the amount of deposit. Furthermore, the bond strength was found to average about 5% better with the use of rubbery polymer dissolved in the polyunsaturated monomer as compared to the same monomer in which no rubber was dissolved. In cases where it is inconvenient to apply the monomer in liquid form it may be substituted by either the normally liquid or normally solid resins containing 1,2-vinyl type unsaturation applied in concentrated form or solution form to either the rubbery surface or the siliceous surface. Film may also be prepared by incorporating 5 to 50 wt. percent of polyunsaturated normally liquid or solid resins into a batch of the rubbery composition to be bonded to the glass; and then calendering the so-treated rubbery composition into strips. When the polyunsaturated liquid or solid resins are to be applied thinly, and particularly when they are not thickened with a rubbery polymer, it is not necessary to add peroxide to the polyunsaturated resins though it is desirable to do so. The peroxide in the rubbery composition to be bonded migrates to a sufficient degree to activate the polyunsaturated resins so that they will copolymerize with the rubbery polymer and with the unsaturated silane on the glass.

contained in the equi-blend of divinyl benzene and A-172. The adhesion values obtained ranged from 32 to 40 lbs./in. for the compounded natural rubber and from 35 to 48 lbs./in. for the compounded nitrile rubber.

A similar run was performed except that only divinyl benzene was brushed onto the surface of each rubbery polymer. The adhesion for both types of glass-rubber products was only 2 lbs./in.

The following can be concluded from Examples XI and XII: rubbery polymers provided with a peroxide can be adhered to untreated glass surfaces through the use of an intermediate layer consisting of an unsaturated silane preferably used in admixture with a polyunsaturated monomer. The good adhesion thusly obtained can be further improved if the intermediate layer mixture also contains a free radical peroxide.

Example XIII

The following compositions may be employed to provide tires therefrom:

|  | Tread | Carcass | Inner liner | Bead insulation | Glass fiber binder |
|---|---|---|---|---|---|
| Enjay butyl HT 10-66 [1] | 100 | 100 | 100 | 100 | 100 |
| HAF black | 60 | 25 |  | 60 |  |
| SRF black |  | 25 |  |  |  |
| MT black |  |  | 60 |  |  |
| EPC black |  |  | 20 | 55 |  |
| FF black |  |  |  |  | 50 |
| Magnesium oxide | 1 | 1 | 1 | 2 | 2 |
| Antioxidant [2] | 1 | 1 | 1 | 1 | 1 |
| Stearic acid | 1 | 1 | 1 | 1 | 1 |
| Amberol ST-137X [3] | 3 | 3 | 5 | 5 |  |
| Flexon 765 [4] | 5 | 10 | 15 | 7 |  |
| Zinc oxide | 3 | 3 | 5 | 8 | 3 |
| Benzothiazyl disulfide | 2 | 2 | 2 | 3 | 2 |
| Tetramethyl thiuram disulfide | 1 | 1 | 1 | 1.5 | 1 |

[1] Chlorinated butyl rubber.
[2] 2,2'-methylene-bis (4-methyl-6-tertiary-butyl) phenol.
[3] Phenol-formaldehyde type resin (Rohm & Haas).
[4] Naphthenic base plasticizer oil (Enjay Chemical).

Example XI

Rubbery polymers were compounded with the ingredients listed herebelow:

|  | A | B |
|---|---|---|
| Pale crepe [1] | 100 |  |
| Paracril C [2] |  | 100 |
| SRF black [3] | 50 | 50 |
| Aminox [4] | 0.5 | 0.5 |
| Stearic acid | 1 | 1 |
| Zinc oxide | 5 | 5 |
| Dicup 40 HAF [5] | 3.75 | 3.75 |

[1] A commercial grade of natural rubber.
[2] 65% butadiene with 35% acrylonitrile.
[3] Carbon black.
[4] Reaction product of an aldehyde and a secondary aromatic amine.
[5] Dicumyl peroxide deposited on HAF carbon black.

Subsequently, 181 satin weave glass fabric, without any silane thereon, was sandwiched between two layers of the rubber composition; and this was sandwiched between canvas for backing purposes. The complete assemblies were then press cured for 30 minutes at 307° F., with 500 p.s.i. pressure. A one-inch wide specimen was then cut from each cured product. A strip adhesion-type test was run on an Instron tester at a jaw separation rate of 2 inches per minute. The strength of the rubber to glass bond was only 2 pounds per inch for both types of rubbery polymers.

The above was repeated except that each rubber composition was brushed with a ¼ mil coating of an equi-blend of divinyl benzene (55% purity) and vinyl silane ester of the monomethyl ether of ethylene glycol (A-172). After similar curing, the adhesion values ranged from 21 to 29 lbs./in. for the natural rubber end product and from 20 to 22 lbs./in. for the nitrile rubber products.

Example XII

Example XI was repeated except that 1.5% dicumyl peroxide based upon the weight of divinyl benzene was The tire cord can be made by twisting and plying glass fiber strands which have been treated with about 1.5 wt. percent one-half hydrolyzed toluene solution of methacryloxy propyl silane, dried for about 1.2 minutes in a drying tower about 350° F., subsequently treated with about a 20 wt. percent solid solution in heptane of the above glass fiber binder composition and dried for about 1.5 minutes in about a 400° F. drying tower (containing steam vapor to avoid fire hazard) to give a rubber coating to the treated fiber glass. The glass fiber binder may also contain 3 parts of styrene grafted polybutadiene prepared by sodium catalysis and having a 2,500 molecular weight. This gives about 50% greater adhesion between glass fiber and rubber than when not using it.

The tires are advantageously cured in press molding equipment with conditions therein varying with the size of tire, but regulated in order that the completed cure equivalent for the various tire components was 20 minutes to 60 minutes at 307° F.

The superior end product from this procedure can be utilized for automobiles, airplanes and/or boat trailers.

Example XIV

In this example, rubber is adhered to a siliceous surface other than glass.

| Paracril | 100 | 100 |
|---|---|---|
| Ground quartz | 50 | 50 |
| Zinc oxide | 5 | 5 |
| Stearic acid | 1 | 1 |
| Dicumyl peroxide | 1.5 | 1.5 |
| A-172 |  | 1 |

Press cure 10 mins. at 307° F.

| Tensile, p.s.i. | 925 | 1865 |
|---|---|---|
| Elongation, percent | 915 | 1010 |
| 300% Modulus, p.s.i. | 240 | 390 |
| Hardness, Shore A | 54 | 54 |
| Tear, lb./in. | 85 | 182 |

This example illustrates that the reinforcing ability of ground quartz can be considerably improved by means of chemically binding the quartz to the rubber through the use of a vinyl silane.

Example XV

Vinyl tri-(B-methoxy ethoxy) silane (A–172), vinyl trimethoxy silane, and gamma methacryloxy propyl trimethoxy silane were each diluted with 1½ moles of water per mole of silane and allowed to stand for at least 24 hours. Each partially hydrolyzed ester was prepared as a solution in methyl ethyl ketone in 0.5 wt. percent concentration for the A–172 and the other two in molar equivalent concentrations. Samples of heat cleaned HG–28 glass fabric were treated with each of the three solutions, allowed to dry free of the solvent at room temperature, and then heated at 150° F. in an oven for ½ hour. Sandwich adhesion tests were then carried out using the following NBR compound:

|  | Parts |
|---|---|
| Paracril C [1] | 100 |
| Pelletex [2] | 50 |
| Aminox [3] | 0.5 |
| Zinc oxide | 5 |
| Stearic acid | 1 |
| Dibutyl phthalate | 15 |
| Dicup–40 HAF [4] | 3.75 |

[1] Butadiene-acrylonitrile ratio of about 65/35.
[2] A semi-reinforcing furnace black.
[3] Condensation product of an aldehyde and a secondary aromatic amine.
[4] Dicumene peroxide in 40% concentration deposited on HAF black.

Cure was effected for 20 minutes at 307° F. under 500 p.s.i.g.

Adhesions obtained between the NBR and HG–28 glass using the three silanes were as follows:

| Silane used: | Adhesion lbs. pull/inch |
|---|---|
| A–172 | 7.5 |
| Vinyl trimethoxy | 4.0 |
| Gamma-methacryloxy propyl trimethoxy | 20.5 |

The methacryloxy alkyl type silane was much more effective than either of the two vinyl types.

Example XVI

One-half hydrolyzed A–172 ester and gamma-methacryloxy-propyl silane were prepared as equivalent solutions in toluene with that of the A–172 being 0.5% based on the anhydrous ester. Each solution also contained 4% of butadiene-styrene copolymer which was prepared by the styrene grafting of a polybutadiene using a sodium catalyst. The graft polymer about 2,500 molecular weight. HG–28 cloth was treated with each of the solutions, air dried, and then oven dried at 212° F. to remove the last traces of toluene. Adhesion tests were carried out using the NBR compound of Example XV and gave a value of 13 lbs. for the A–172 and greater than 41 lbs. (failure in rubber compound) for the other. Although use of the polyolefinic resin resulted in increased bonding with both silanes, that with the methacryloxy alkyl type was superior.

Example XVII

HG–28 cloth, heat cleaned, was washed with aqueous 1% acetic acid soultion at 75° C., followed by rinsing in distilled water at 75° C., and then dried at 220° F. A 10% aqueous solution of gamma-methacryloxypropyl trimethoxy silane was prepared by shaking with 0.1% aqueous acetic acid and this was then diluted to 1% with water to give a clear solution. The HG–28 cloth, cleaned as described above, was treated with the 1% silane solution, dried in air, and then heated at 212° F. for ½ hour. Adhesion of the cloth so treated was tested with the following synthetic polyisoprene rubber:

|  | Parts |
|---|---|
| Cis-polyisoprene rubber | 100 |
| SRF carbon black | 50 |
| Stearic acid | 1 |
| Zinc oxide | 5 |
| Dicup–40 HAF | 3.75 |

Cure was at 307° F. for 20 minutes under about 500 p.s.i.g. Adhesion was 44 lbs. pull per inch and failure was in the rubber compound rather than at the glass-rubber interfaces.

Example XVIII

The adhesion test of Example XVII was repeated, but the glass was used directly after cleaning by hot acetic acid and water washing. Adhesion was only 1.5 lbs. pull per inch. Another test was run in which the butadiene-styrene graft polymer of Example XVI was used directly on the glass with no silane and the rubber compound cured thereto in the usual manner. Adhesion was only 2.1 lbs. pull per inch.

Example XIX

The same rubber formulation and procedure as set forth in Example VIII was carried out except that HG–28 taffeta weave glass cloth was used in place of 181 satin weave and yielded an adhesion of 15 lbs. pull per inch.

This run was repeated except gamma-methacryloxy-propyl trimethoxy silane was substituted for the vinyl tri(beta-methoxy ethoxy) silane. The laminate had an adhesion of 38 lbs. pull per inch.

Using the same reactants, rubber compound, silanes, and peroxides as set forth in the second paragraph of Example VIII but using the A–172 silane in all cases, three comparative tests of glass-rubber adhesion were carried out. They differed from each other in that the silane treated and dried glass cloth (HG–28) was further treated with 4% solutions in toluene, three separate test specimens, with each of the following three resinous polymers with the indicated adhesion results.

(A) A polybutadiene prepared by polymerizing butadiene with a water-boron trifluoride catalyst yielding largely 1,4-type polymerization additive—adhesion 23 lbs. pull per inch.

(B) A polybutadiene prepared by polymerizing butadiene with a metallic sodium catalyst to give about 65% of 1,2-type polymerization additive in the polybutadiene—adhesion 33 lbs. pull per inch.

(C) A polybutadiene prepared by polymerizing butadiene with butyl lithium catalyst yielding a resin of about 85% 1,2-type polymerization additive—adhesion was 38 lbs. pull per inch.

As pointed out, the control sample set forth in the first paragraph of this example gave an adhesion of only 15 lbs. pull per inch whereas in combination with the resin crosslinking agents of the vinyl type unsaturation gave adhesions of more than twice that amount.

Example XX

Fiber glass strands containing a commercial binder-lubricant sizing are heat cleaned at about 1000° F. for about one minute to remove the commercial sizing. The heat-cleaned glass strands are then dipped in a 1 weight percent aqueous solution (containing 0.02 weight percent morpholine) of vinyl tri(beta-methoxyethoxy) silane (A–172 silane) and the silane-treated glass strands are then air dried overnight at room temperature. The dried silane-treated glass strands are then dipped in a methylethyl ketone solution containing 20 weight percent of the following NBR compound:

| | Parts |
|---|---|
| Paracril–C | 100 |
| SRF black | 25 |
| Aminox | 0.5 |
| Zinc oxide | 5 |
| Stearic acid | 1 |
| Dicup–40 HAF | 1.88 |

The NBR coated glass strands are then air dried overnight at room temperature, subsequently twisted and plied into a cord and then employed in the reinforcement of a hose prepared from Paracril–C.

Paracril–C is compounded according to the recipe set forth below and employed in the preparation of the hose tube, hose layer and hose cover:

| | Parts |
|---|---|
| Paracril–C | 100 |
| SRF black | 100 |
| Aminox | 0.5 |
| Zinc oxide | 5 |
| Stearic acid | 1 |
| Dicup–40 HAF | 3.75 |
| Dibutyl phthalate | 30 |

A hose tube of 3 inches I.D. is prepared by extruding the compounded Paracril–C and then forcing it onto a mandrel in the conventional manner. The dried Paracril–C coated glass cord is then wound on top of the hose tube with the warp running at an angle of 55 degrees. The hose layer is then laid on top of the dried Paracril–C coated glass cord and a second ply of the dried Paracril–C coated glass fabric is wound on top of the hose layer with the warp running at an angle of 55 degrees in the opposite direction to that of the first ply. The hose cover is then laid on top of the second ply and the resultant hose is then wrapped with a conventional heat-shrinkable nylon pressure wrapping fabric. The wrapped hose is then conventionally cured at about 300° F. in an autoclave under 40 p.s.i.g. for 60 minutes. The hose is then removed from the autoclave, cooled overnight and the nylon wrapping is removed. A ten-foot length of the hose is subjected to a conventional hydroburst test and it ruptured at an internal pressure of about 900 p.s.i. (The theoretical burst strength of the rubber is 1000 p.s.i.)

The aforementioned procedure is again repeated under identical conditions with the exception that the A–172 silane treated glass fabric is not subsequently coated with the NBR compound prior to its use in the reinforcement of the hose. In this instance the hose ruptured at an internal pressure of only about 175 p.s.i., thus indicating the marked advantages of reinforcing a rubber with an elastomer coated silane treated reinforcing agent rather than with a silane treated reinforcing agent containing no elastomer top coating.

The aforementioned procedure is again repeated under identical conditions with the cord being treated with the A–172 silane and the butadiene-styrene copolymer of Example XVI. In case A, the treated cord is not coated with the NBR compound prior to its use in the reinforcement of the hose and the hose ruptures at an internal pressure of only about 200 p.s.i. In case B, the treated cord is coated with the NBR compound and subsequently used in the reinforcement of the hose; in case B, the hose ruptures at about 1000 p.s.i. (the theoretical burst strength of the Paracril-C rubber itself is in the order of 1000 p.s.i.).

Example XXI

A commercial grade of alumina-borosilicate fiber glass (known as "E Glass" comprising a strand having 200 to 1200 filaments drawn from a multiple-hose bushing; the grades vary in diameter from 0.00015 to 0.0007 inch) consisting of an electrical grade of continuous filaments (0.00036 inch diameter) which are composited to form a strand was employed in this experiment. The strand had been twisted into a cord (4 turns of twist in the Z-direction and the cord then twisted 3.8 turns in the S-direction) and the cord, comprised a 150 yarn count of the individually twisted strands.

The cord was treated with the A–172 silane and butadiene-styrene copolymer as in Example XVI. In another run, the cord was treated with the A–172 silane solution containing 4% of polyvinyl acetate; the treatment in the latter run was the same as in Example XVI except that polyvinyl acetate was substituted for the butadiene-styrene copolymer. The treated cords were then treated with the methylethyl ketone solution (20 weight percent solids) of the NBR compound as in Example XX and subsequently air dried overnight at room temperature. Each NBR-coated fiber glass cord was then contacted with Paracril–C belting stock prepared from the same recipe as shown for the hose tube, hose layer and hose cover in Example XX and curing was then carried out under the conditions set forth in Example XX.

The NBR-coated cord containing the butadiene-styrene copolymer had a tensile strength of 43 p.s.i. and after curing, a tensile strength of 60 p.s.i., and an H adhesion of 15 pounds. The belting reinforced with this NBR-coated cord, when flexed on a Scott Flexometer, showed 1,370,000 cycles before breaking.

In contrast, the NBR-coated cord containing the polyvinyl acetate (a common type of sizing agent) had a tensile strength of 38 p.s.i. and after curing, a tensile strength of 20 p.s.i. and an H adhesion of 8 pounds. Belting reinforced with this sample, when flexed on a Scott Flexometer, broke after only 6,000 cycles.

It is to be understood that this invention is not limited to the specific examples which have been offered merely as illustrations and that modifications may be made without departing from the spirit of the invention.

What is claimed is:

1. A process for reinforcing rubbers which comprises, in combination, the steps of:
   (a) treating the surfaces of a siliceous material with a liquid composition containing an organosilane compound selected from the group consisting of an unsaturated silane, its siloxane and mixtures thereof, said unsaturated silane having the formula:

wherein $R_1$ is a radical containing vinyl-type unsaturation and is selected from the group consisting of alkenyl, styryl, alkenoylalkyl and alkenoylloxyalkyl, X is selected from the group consisting of halogen, hydroxyl, alkoxy and acyloxy, and $R_2$ and $R_3$ are independently selected from the group consisting of hydroxyl, methyl, halogen, alkoxy, acryloxy and $R_1$;
   (b) treating the organosilane-treated siliceous material with a liquid composition containing a multi-unsaturated crosslinking agent containing at least 50% of its olefinic unsaturation of the 1,2-type ethylenic unsaturation and having a molecular weight of up to about 15,000; and
   (c) curing a free radical, curable rubber while in contact with the treated siliceous material from step (b) with the aid of a free radical curing agent, said free radical curable rubber being selected from the group consisting of natural rubber, synthetic polyisoprene, ethylene-alpha-olefin terpolymer, the copolymer of butadiene with styrene, the copolymer of butadiene with acrylonitrile, chlorinated butyl rubber, brominated butyl rubber, polybutadiene, polychloroprene and mixtures of two or more of the aforesaid rubbers.

2. A process as in claim 1 wherein the siliceous material is fiber glass.

3. A process as in claim 1 wherein the silane is an alkenyl silane.

4. A process as in claim 1 wherein the silane is an alkenoyloxyalkyl silane.

5. A process as in claim 1 wherein the multi-unsaturated crosslinking agent is a multi-vinyl aromatic compound having the general formula:

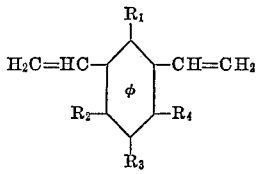

wherein $R_1$, $R_2$, $R_3$ and $R_4$ attached to the ring are each independently selected from the group consisting of hydrogen, halogens, alkyl groups containing up to 4 carbon atoms, and vinyl, and $\phi$ is an aromatic nucleus.

6. A process as in claim 1 wherein the multi-unsaturated crosslinking agent is a methacrylate ester of a polyhydric alcohol.

7. A process as in claim 1 wherein the multi-unsaturated crosslinking agent is a normally liquid polymer prepared from 50 to 100 wt. percent of a $C_4$–$C_6$ conjugated diolefin and from 50 to 0 wt. percent of a vinyl-containing monomer.

8. A process as in claim 1 wherein the multi-unsaturated crosslinking agent is a normally solid resinous polymer prepared from 40 to 80 wt. percent of a $C_4$–$C_6$ conjugated diolefin and from 60 to 20 wt. percent of a vinyl-containing monomer.

9. A reinforced rubber comprising:
(a) a siliceous material having a coating of:
(1) an organosilane compound selected from the group consisting of an unsaturated silane, its siloxane and mixtures thereof, said unsaturated silane having the formula:

wherein $R_1$ is a radical containing vinyl-type unsaturation and is selected from the group consisting of alkenyl, styryl, alkenoylalkyl and alkenoyloxyalkyl, X is selected from the group consisting of halogen, hydroxy, alkoxy and acyloxy, and $R_2$ and $R_3$ are independently selected from the group consisting of hydroxyl, methyl, halogen, alkoxy, acryloxy and $R_1$; and
(2) a multifunctional crosslinking agent containing at least 50% of its olefinic unsaturation of the 1,2-type ethylenic unsaturation and having a molecular weight of up to about 15,000; and
(b) a free radical cured rubber bonded to the treated siliceous material of (a) by curing the rubber and the treated siliceous material while in contact with each other with the aid of a free radical curing agent, said free radical curable rubber being selected from the group consisting of natural rubber, synthetic polyisoprene, ethylene-alpha-olefin terpolymer, the copolymer of butadiene with acrylonitrile, chlorinated butyl rubber, brominated butyl rubber, polybutadiene, polychloroprene and mixtures of two or more of the aforesaid rubbers.

10. A reinforced rubber as in claim 9 wherein the siliceous materia is fiber glass.

11. A reinforced rubber as in claim 9 wherein the silane is an alkenyl silane.

12. A reinforced rubber as in claim 9 wherein the silane is an alkenoyloxyalkyl silane.

13. A reinforced rubber as in claim 9 wherein the multi-unsaturated crosslinking agent is a normally liquid polymer prepared from 50 to 100 wt. percent of a $C_4$–$C_6$ conjugated diolefin and from 50 to 0 wt. percent of a vinyl-containing monomer.

14. A reinforced rubber as in claim 9 wherein the multi-unsaturated crosslinking agent is a normally solid resinous polymer prepared from 40 to 80 wt. percent of a $C_4$–$C_6$ conjugated diolefin and from 60 to 20 wt. percent of a vinyl-containing monomer.

15. A rubber tire containing at least one layer of a composition comprising the reinforced rubber as in claim 9.

16. In a tire adapted for use without an inner tube, the combination which comprises an open-bellied body terminating in spaced bead portions having an inner lining of a member selected from the group consisting of an iso-olefin-multiolefin polymer of butyl rubber, natural rubber, and halogenated butyl rubber; air sealing means at said bead portions; and a tread and sidewall area intermediate of said bead portions; and intermediate layer contiguous to said tread and sidewall area; wherein the composition of said inner lining comprises a reinforced rubber as in claim 9.

17. In a tire adapted for use without an inner tube, the combination which comprises an open-bellied body terminating in spaced bead portions having an inner lining; air sealing means at said bead portions; and a tread and sidewall area intermediate of said bead portions, wherein the composition of said tread and sidewall area comprises a reinforced rubber as in claim 9.

18. A process for reinforcing rubbers which comprises, in combination, the steps of:
(a) treating the surfaces of a siliceous material with a liquid composition containing an organosilane compound selected from the group consisting of an unsatured silane, its siloxane and mixtures thereof, said unsaturated silane having the formula:

wherein $R_1$ is a radical containing vinyl-type unsaturation and is selected from the group consisting of alkenyl, styryl, alkenoylalkyl and alkenoyloxyalkyl, X is selected from the group consisting of halogen, hydroxyl, alkoxy and acyloxy, and $R_2$ and $R_3$ are independently selected from the group consisting of hydroxy, methyl, halogen, alkoxy, acryloxy and $R_1$;
(b) treating the organosilane-treated siliceous material with a liquid composition containing a multi-unsaturated crosslinking agent containing at least 50% of its olefinic unsaturation of the 1,2-type ethylenic unsaturation and having a molecular weight of up to about 15,000;
(c) treating the treated siliceous material from step (b) with a liquid composition containing a free radical-curable elastomer and 0.2 to 10 parts, per part of the elastomer, of a free radical curing agent, said free radical curable elastomer being selected from the group consisting of natural rubber, synthetic polyisoprene, ethylene-alpha-olefin terpolymer, the copolymer of butadiene with styrene, the copolymer of butadiene with acrylonitrile, chlorinated butyl rubber, brominated butyl rubber, polybutadiene, polychloroprene and mixtures of two or more of the aforesaid elastomers;
(d) drying the resultant product from step (c) until it is substantially free of any diluent or solvent so as to obtain a siliceous material whose surfaces have been substantially coated with 10 to 60 wt. percent, based on the total weight of the elastomer-coated siliceous material, of said curing agent-containing free radical-curable elastomer; and
(e) contacting the elastomer-coated siliceous material from step (d) with a rubber and curing the rubber while in contact with said material from step (d) in the presence of a conventional curing agent.

19. A process as in claim 18 in which the siliceous material is fiber glass.

20. A process as in claim 18 in which the silane is an alkenyl silane.

21. A process as in claim 18 in which the silane is an alkenoyloxyalkyl silane.

22. A reinforced rubber containing at least one layer of a rubber bonded to an elastomer-coated siliceous material by curing the rubber in contact with the elastomer-coated siliceous material with a conventional curing agent, said elastomer-coated siliceous material containing on its surfaces:
  (a) an initial coating of
    (1) an organosilane compound selected from the group consisting of an unsaturated silane, its siloxane and mixtures thereof, said unsaturated silane having the formula:

wherein $R_1$ is a radical containing vinyl-type unsaturation and is selected from the group consisting of alkenyl, styryl, alkenoylalkyl and alkenoyloxyalkyl, X is selected from the group consisting of halogen, hydroxyl, alkoxy and acyloxy, and $R_2$ and $R_3$ are independently selected from the group consisting of hydroxyl, methyl, halogen, alkoxy, acryloxy and $R_1$; and
    (2) a multi-unsaturated crosslinking agent containing at least 50% of its olefinic unsaturation of the 1,2-ethylenic type and having a molecular weight of up to about 15,000; and
  (b) an elastomer top coating comprising 10 to 60 wt. percent, based on the total weight of the elastomer-coated siliceous material, of a free radical curable elastomer containing 0.2 to 10 parts, per 100 parts of the elastomer, of a free radical curing agent, said elastomer-coated siliceous material having been dried until any diluent or solvent has been substantially removed therefrom, said free radical curable elastomer being selected from the group consisting of natural rubber, synthetic polyisoprene, ethylene-alpha-olefin terpolymer, the copolymer of butadiene with styrene, the copolymer of butadiene with acrylonitrile, chlorinated butyl rubber, brominated butyl rubber, polybutadiene, polychloroprene and mixtures of two or more of the aforesaid elastomer.

23. A reinforced rubber as in claim 22 wherein the siliceous material is fiber glass.

24. A rubber tire containing at least one layer of the reinforced rubber as in claim 22.

References Cited

UNITED STATES PATENTS

| | | | |
|---|---|---|---|
| 2,827,099 | 3/1958 | Youngs | 152—359 |
| 2,831,829 | 4/1958 | Brooks | 260—41.5 |
| 2,885,383 | 5/1959 | Brooks | 260—45.4 |
| 2,892,972 | 6/1959 | Ross | 161—192 |
| 2,952,576 | 9/1960 | Wheelock et al. | 161—192 |
| 3,062,242 | 11/1962 | Vanderbilt | 161—193 |

EARL M. BERGERT, *Primary Examiner.*

C. B. COSBY, *Assistant Examiner.*

U.S. Cl. X.R.

117—76, 77; 156—110, 338, 329; 161—193, 206, 208, 239